US009327355B2

(12) United States Patent
Struss et al.

(10) Patent No.: US 9,327,355 B2
(45) Date of Patent: May 3, 2016

(54) UNIVERSAL PORTABLE WORK STATION

(71) Applicants: John Struss, Nazareth, PA (US); Adam Struss, Nazaareth, PA (US)

(72) Inventors: John Struss, Nazareth, PA (US); Adam Struss, Nazaareth, PA (US)

( * ) Notice: Subject to any disclaimer, the term of this patent is extended or adjusted under 35 U.S.C. 154(b) by 261 days.

(21) Appl. No.: 14/048,850

(22) Filed: Oct. 8, 2013

(65) Prior Publication Data
US 2015/0097324 A1     Apr. 9, 2015

(51) Int. Cl.
*B23D 47/02*     (2006.01)
*B23D 45/06*     (2006.01)
*B27B 5/22*      (2006.01)

(52) U.S. Cl.
CPC .............. *B23D 47/025* (2013.01); *B23D 45/06* (2013.01); *B27B 5/222* (2013.01); *B23D 45/062* (2013.01)

(58) Field of Classification Search
CPC .. B23D 47/025; B23D 45/021; B23D 45/062; B23D 45/068; B23D 45/14
See application file for complete search history.

(56) References Cited

U.S. PATENT DOCUMENTS

| | | | |
|---|---|---|---|
| 2,810,412 A * | 10/1957 | Roug | 83/477.2 |
| 3,905,263 A | 9/1975 | Smith | |
| 4,068,550 A | 1/1978 | Gray et al. | |
| 4,105,055 A | 8/1978 | Brenta | |
| RE30,689 E | 7/1981 | Gray et al. | |
| 4,377,099 A | 3/1983 | Howe | |
| 4,483,573 A * | 11/1984 | Keller | 312/281 |
| 4,497,353 A | 2/1985 | Sproat, Jr. | |
| 4,611,823 A * | 9/1986 | Haas | 280/641 |
| 4,860,807 A * | 8/1989 | Vacchiano | 144/286.1 |
| 5,857,507 A * | 1/1999 | Puzio et al. | 144/287 |
| 5,863,052 A | 1/1999 | Roman | |
| 2011/0079127 A1 | 4/2011 | Somogyi et al. | |
| 2012/0048090 A1* | 3/2012 | Etter et al. | 83/473 |

* cited by examiner

*Primary Examiner* — Lee D Wilson
*Assistant Examiner* — Seahee Yoon

(57) ABSTRACT

A circular saw conversion table device supports a circular saw in position for use as a table saw. The device includes a panel having a top surface, a bottom surface, and a perimeter edge extending around and between the top surface and the bottom surface. A slot extends through the panel. A track is coupled to the bottom surface of the panel. The track extends around the slot. The track defines a lip configured for receiving and supporting a deck of a circular saw such that the a blade of the circular saw extends through the slot and projects from the top surface of the panel. A stand is coupled to the panel and configured for supporting the panel on a surface.

16 Claims, 6 Drawing Sheets

UNIVERSAL PORTABLE WORK STATION

BACKGROUND OF THE DISCLOSURE

Field of the Disclosure

The disclosure relates to table devices and more particularly pertains to a new table device for supporting a circular saw in position for use as a table saw.

SUMMARY OF THE DISCLOSURE

An embodiment of the disclosure meets the needs presented above by generally comprising a panel having a top surface, a bottom surface, and a perimeter edge extending around and between the top surface and the bottom surface. A slot extends through the panel. A track is coupled to the bottom surface of the panel. The track extends around the slot. The track defines a lip configured for receiving and supporting a deck of a circular saw such that the a blade of the circular saw extends through the slot and projects from the top surface of the panel. A stand is coupled to the panel and configured for supporting the panel on a surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
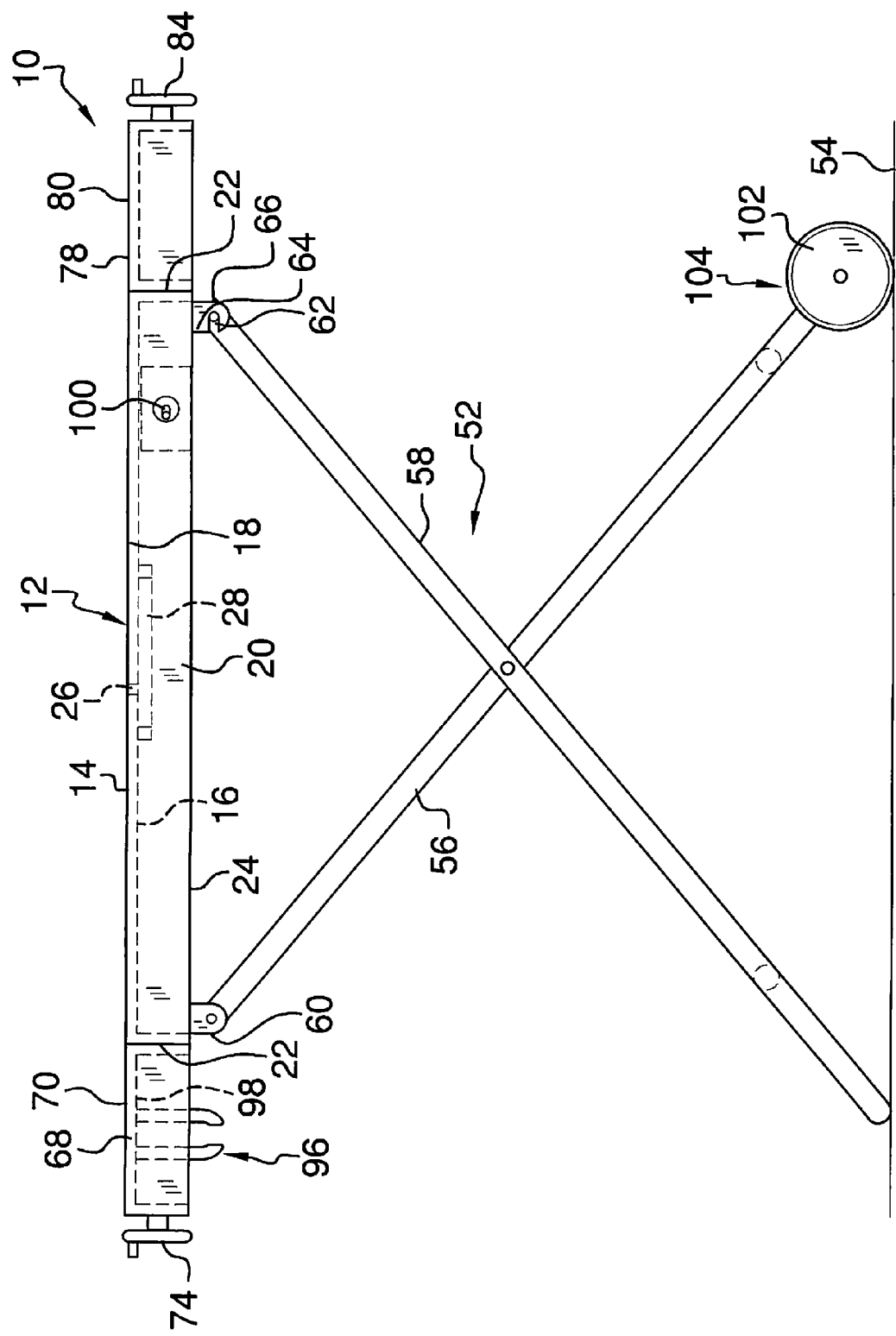
FIG. 1 is a front view of a circular saw conversion table device according to an embodiment of the disclosure.
Figure 2:
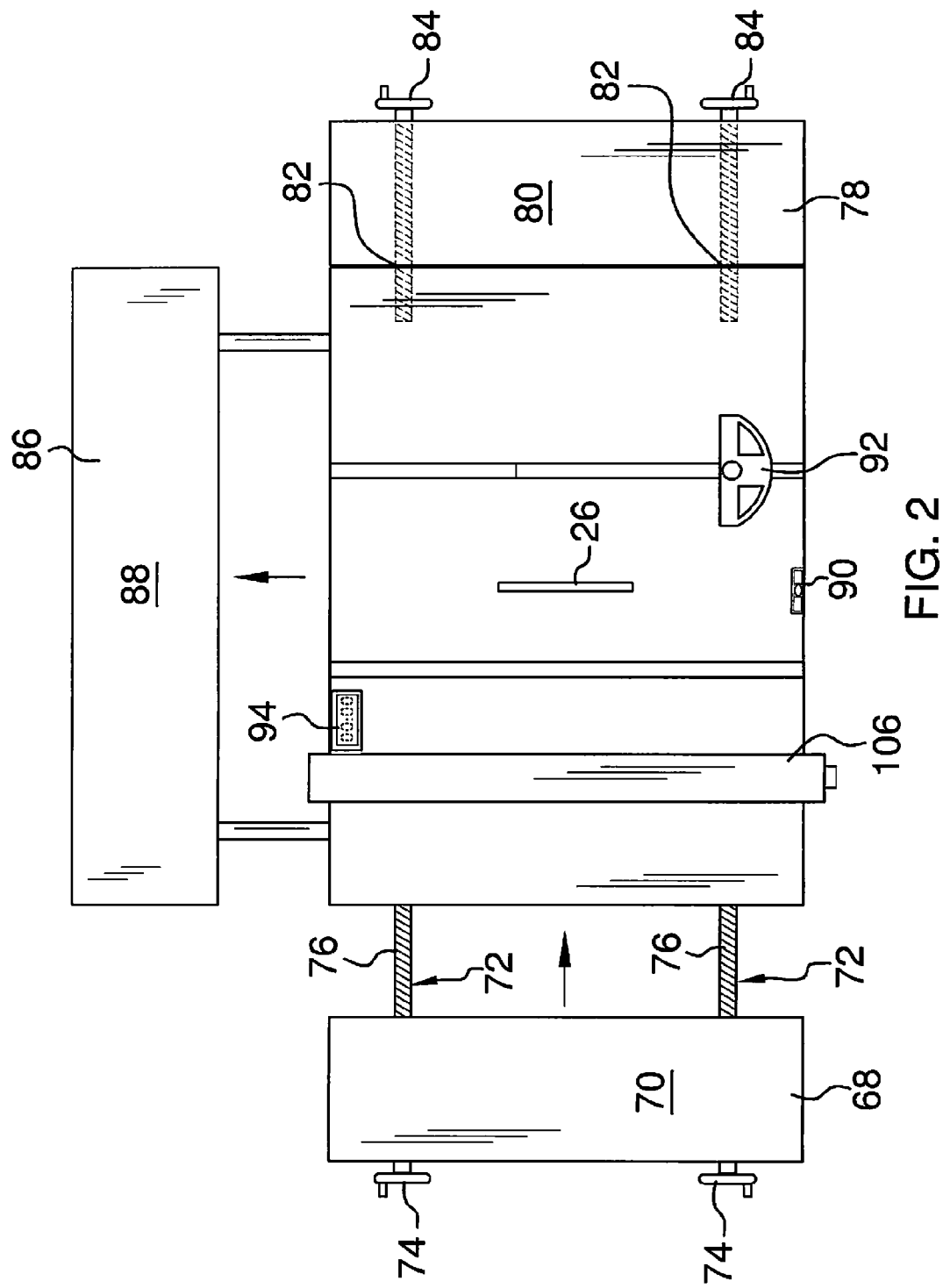
FIG. 2 is a top view of an embodiment of the disclosure.
Figure 3:
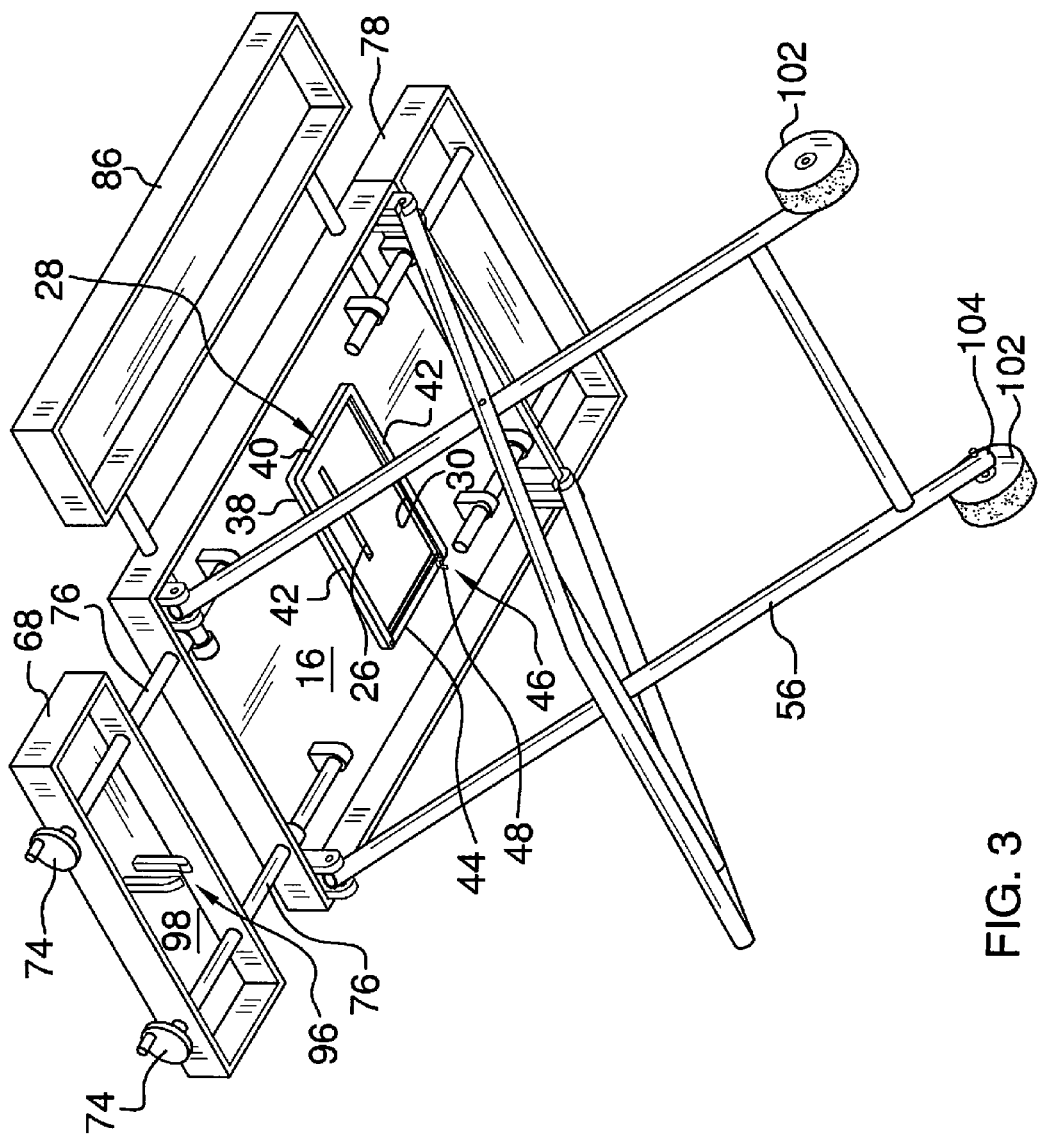
FIG. 3 is a bottom back side perspective view of an embodiment of the disclosure.
Figure 4:
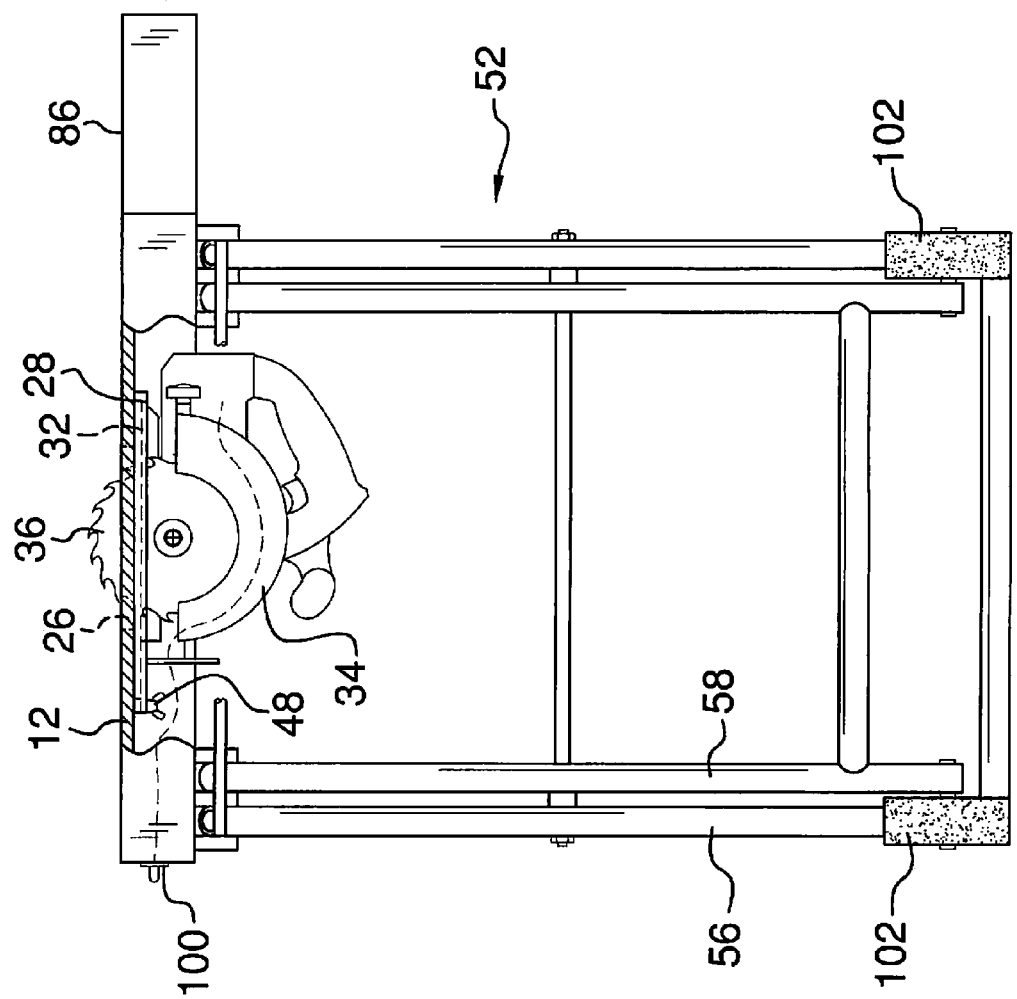
FIG. 4 is a side view of an embodiment of the disclosure.
Figure 5:
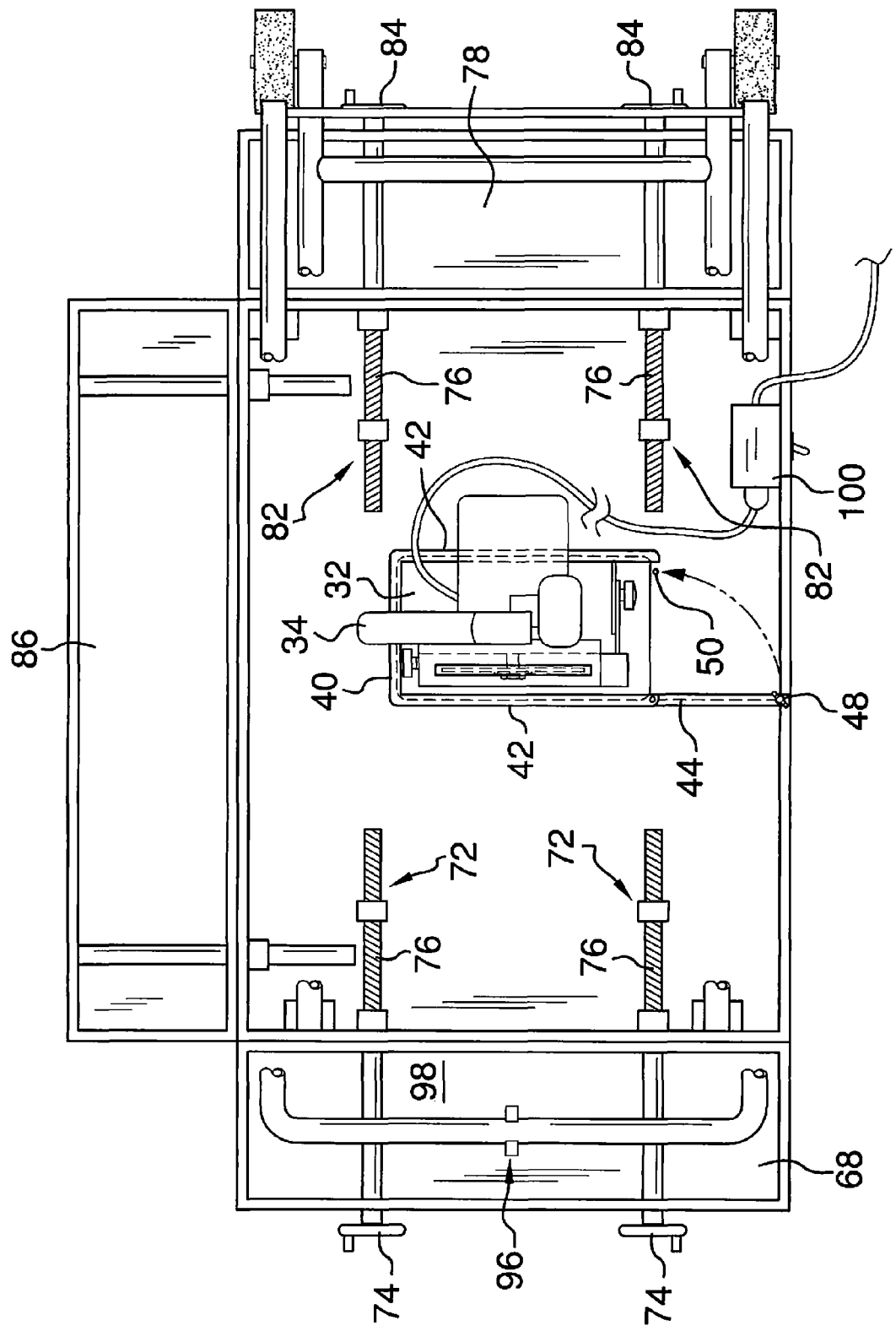
FIG. 5 is a bottom view of an embodiment of the disclosure.
Figure 6:
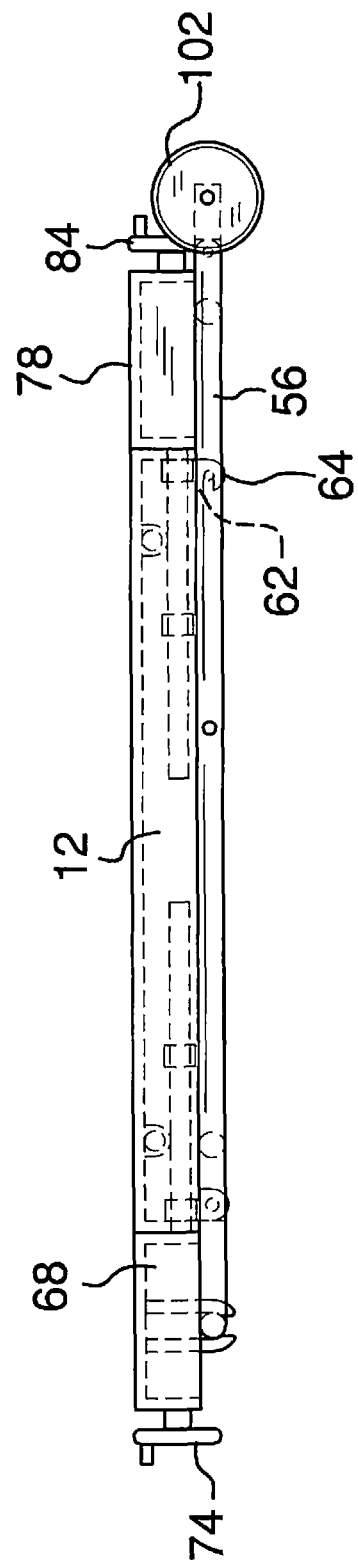
FIG. 6 is a front view of an embodiment of the disclosure in a collapsed position.

With reference now to the drawings, and in particular to FIGS. 1 through 6 thereof, a new table device embodying the principles and concepts of an embodiment of the disclosure and generally designated by the reference numeral 10 will be described.

As best illustrated in FIGS. 1 through 6, the circular saw conversion table device 10 generally comprises a panel 12 having a planar top surface 14, a bottom surface 16, and a perimeter edge 18 extending around and between the top surface 14 and the bottom surface 16. The perimeter edge further extends downwardly from the bottom surface 16 forming a perimeter wall 20 extending around the panel 12. The panel 12 has a pair of opposed end edges 22 and a pair of opposed longitudinal sides 24. A slot 26 extends through the panel 12 between the top surface 14 and the bottom surface 16. A track 28 is coupled to the bottom surface 16 of the panel 12. The track 28 extends around the slot 26. The track 28 defines a lip 30 configured for receiving and supporting a deck 32 of a circular saw 34 such that the a blade 36 of the circular saw 34 extends through the slot 26 and projects from the top surface 14 of the panel 12. Thus, the top surface 14 and blade 36 may function as a table saw. The track 28 has a fixed portion 38 comprising an end section 40 and a pair of lateral side sections 42. The track 28 has a door section 44 pivotally coupled to one of the lateral side sections 42. The door section 44 is pivotable between an open position and a closed position. The door section 44 extends between the lateral side sections 42 when the door section 44 is in the closed position to securely engage the deck 32 of the circular saw 34 whereby the circular saw 34 is secured to the panel 12. A locking member 46 selectively secures the door section 44 to the panel 12 wherein the door section 44 is selectively held in the closed position. The locking member 46 may comprise a wing nut 48 coupled to the door section 44. The nut 48 engages a hole 50 extending into the bottom surface 16 of the panel 12 to secure the door section 44.

A stand 52 is coupled to the panel 12. The stand 52 is configured for supporting the panel 12 on a surface 54. The stand 52 may comprise a first leg 56 pivotally coupled to a second leg 58. An upper end 60 of the first leg 56 is pivotally coupled to the panel 12. A notch 62 is coupled to the panel 12 and may be horizontally oriented extending into a projection 64 extending from the bottom surface 16 of the panel 12. An upper end 66 of the second leg 58 is selectively engageable to the notch 62 wherein the stand 52 is held in an extended position supporting the panel 12.

A first plate 68 may be coupled to the panel 12. The first plate 68 has an upper surface 70 coplanar with the top surface 14 of the panel 12. The first plate 68 is slidably coupled to the panel 12 wherein the first plate 68 is selectively extendable from a first one of the end edges 22 of the panel 12. A first side screw drive 72 may be employed coupling the first plate 68 to the panel 12. A first side handle 74 is coupled to the first side screw drive 72 such that rotation of the first side handle 74 turns the first side screw drive 72 wherein the first plate 68 is moved relative to the panel 12 and may be used as a clamp as well as an extendable support. The first side screw drive 72 may employ a pair of spaced screws 76, each having a respective first side handle 74. Similarly, a second plate 78 may be coupled to the panel 12 having an upper surface 80 coplanar with the top surface 14 of the panel 12. The second plate 78 is slidably coupled to the panel 12 wherein the second plate 78 is selectively extendable from a second one of the end edges 22 of the panel 12. A second side screw drive 82 couples the second plate 78 to the panel 12 and a second side handle 84 is coupled to the second side screw drive 82. Rotation of the second side handle 84 turns the second side screw drive 82 wherein the second plate 78 is moved relative to the panel 12. The second side screw drive 82 may also employ spaced screws 76 and a pair of the second side handles 84. An elongated support 86 has an upper surface 88 coplanar with the top surface 14 of the panel 12. The support 86 is slidably coupled to the panel 12 wherein the support 86 is selectively extendable from one of the longitudinal sides 24 of the panel 12.

A level 90 may be coupled to the panel 12 in a manner that the level 90 indicates when the upper surface 14 of the panel 12 is in a horizontal position. Conventional mechanisms may be employed for adjusting the panel 12 relative to the stand 52 to set the panel 12 in a level position. A miter gauge 92 may also be coupled to the panel 12 for use in a conventional manner. A digital clock 94 may also be coupled to the panel 12 and viewable when looking at the upper surface 14 of the panel 12. A switch 100 is coupled to the panel 12 and may be positioned on the perimeter wall 20. The switch 100 is configured for coupling between a power source and the circular saw 34 wherein the circular saw 34 is selectively actuated by manipulation of the switch 100. A rip fence 106 may also be coupled to the panel 12.

A clip 96 may be coupled to the panel 12 via mounting to the first plate 68. The clip 96 selectively engages the stand 52 wherein the stand 52 is retained in a collapsed position adjacent to the bottom surface 16 of the panel 12. The clip 96 is coupled to a lower surface 98 of the first plate 68 wherein the stand 52 is coupled to the first plate 68 when the stand 52 is fully retracted and the first plate 68 is in an unextended position. A pair of wheels 102 may be coupled to a lower end 104 of the first leg 56 to facilitate movement of the device 10.

In use, the panel 12 is supported on the stand 52. The circular saw 34 is coupled to the panel 12 by seating the deck 32 of the circular saw 34 in the track 28 and securing the door section 44 of the track 28 in the closed position. The circular saw 34 is electrically coupled to the switch 100 and may be selectively activated by manipulation of the switch 100. The device 10 may then be used in the same manner as a conventional table saw.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A circular saw conversion table device comprising:
a panel having a top surface, a bottom surface, and a perimeter edge extending around and between said top surface and said bottom surface;
a slot extending through said panel;
a track coupled to said bottom surface of said panel, said track extending around said slot, said track defining a lip configured for receiving and supporting a deck of a circular saw such that a blade of the circular saw extends through said slot and projects from said top surface of said panel, said track having a fixed portion relative to said panel, said fixed portion comprising an end section and a pair of lateral side sections, said track having a door section pivotally coupled to one of said lateral side sections such that said door section pivots in a plane parallel to said panel, said door section being pivotable between an open position and a closed position, said door section extending between said lateral side sections when said door section is in said closed position; and
a stand coupled to said panel, said stand being configured for supporting said panel on a surface.

2. The device of claim 1, further comprising:
said panel having a pair of opposed end edges; and
a first plate being coupled to said panel, said first plate having an upper surface coplanar with said top surface of said panel, said first plate being slidably coupled to said panel wherein said first plate is selectively extendable from a first one of said end edges of said panel.

3. The device of claim 2, further comprising a second plate being coupled to said panel, said second plate having an upper surface coplanar with said top surface of said panel, said second plate being slidably coupled to said panel wherein said second plate is selectively extendable from a second one of said end edges of said panel.

4. The device of claim 1, further comprising a locking member selectively securing said door section to said panel wherein said door section is selectively held in said closed position.

5. The device of claim 4, further comprising said locking member comprising a nut coupled to said door section, said nut engaging a hole extending into said bottom surface of said panel.

6. The device of claim 1, further comprising an elongated support having an upper surface coplanar with said top surface of said panel, said support being slidably coupled to said panel wherein said support is selectively extendable from a longitudinal side of said panel.

7. The device of claim 1, further comprising:
said stand comprising a first leg pivotally coupled to a second leg, an upper end of said first leg being pivotally coupled to said panel; and
a notch coupled to said panel, an upper end of said second leg being selectively engageable to said notch wherein said stand is held in an extended position.

8. The device of claim 1, further comprising a level coupled to said panel, said level indicating when said upper surface of said panel is in a horizontal position.

9. The device of claim 1, further comprising a miter gauge coupled to said panel.

10. The device of claim 2, further comprising:
a first side screw drive coupling said first plate to said panel; and
a first side handle coupled to said first side screw, rotation of said first side handle turning said first side screw wherein said first plate is moved relative to said panel.

11. The device of claim 3, further comprising:
a second side screw drive coupling said second plate to said panel; and
a second side handle coupled to said second side screw, rotation of said second side handle turning said second side screw wherein said second plate is moved relative to said panel.

12. The device of claim 7, further comprising a clip coupled to said panel, said clip selectively engaging said stand wherein said stand is retained in a collapsed position.

13. The device of claim 12, further comprising said clip being coupled to a lower surface of a first plate wherein said stand is coupled to said first plate when said stand is fully retracted and said first plate is in an unextended position.

14. The device of claim 13, further comprising a pair of wheels coupled to said first leg.

15. The device of claim 1, further comprising a switch coupled to said panel, said switch being configured for coupling between a power source and the circular saw wherein the circular saw is selectively actuated by manipulation of said switch.

16. A circular saw conversion table device comprising:

a panel having a top surface, a bottom surface, and a perimeter edge extending around and between said top surface and said bottom surface, said panel having a pair of opposed end edges;

a slot extending through said panel;

a track coupled to said bottom surface of said panel, said track extending around said slot, said track defining a lip configured for receiving and supporting a deck of a circular saw such that said a blade of the circular saw extends through said slot and projects from said top surface of said panel, said track having a fixed portion comprising an end section and a pair of lateral side sections, said track having a door section pivotally coupled to one of said lateral side sections such that said door section pivots in a plane parallel to said panel, said door section being pivotable between an open position and a closed position, said door section extending between said lateral side sections when said door section is in said closed position;

a stand coupled to said panel, said stand being configured for supporting said panel on a surface, said stand comprising a first leg pivotally coupled to a second leg, an upper end of said first leg being pivotally coupled to said panel;

a first plate being coupled to said panel, said first plate having an upper surface coplanar with said top surface of said panel, said first plate being slidably coupled to said panel wherein said first plate is selectively extendable from a first one of said end edges of said panel;

a second plate being coupled to said panel, said second plate having an upper surface coplanar with said top surface of said panel, said second plate being slidably coupled to said panel wherein said second plate is selectively extendable from a second one of said end edges of said panel;

a locking member selectively securing said door section to said panel wherein said door section is selectively held in said closed position, said locking member comprising a nut coupled to said door section, said nut engaging a hole extending into said bottom surface of said panel;

an elongated support having an upper surface coplanar with said top surface of said panel, said support being slidably coupled to said panel wherein said support is selectively extendable from a longitudinal side of said panel;

a notch coupled to said panel, an upper end of said second leg being selectively engageable to said notch wherein said stand is held in an extended position;

a level coupled to said panel, said level indicating when said upper surface of said panel is in a horizontal position;

a miter gauge coupled to said panel;

a first side screw drive coupling said first plate to said panel;

a first side handle coupled to said first side screw, rotation of said first side handle turning said first side screw wherein said first plate is moved relative to said panel;

a second side screw drive coupling said second plate to said panel;

a second side handle coupled to said second side screw, rotation of said second side handle turning said second side screw wherein said second plate is moved relative to said panel;

a clip coupled to said panel, said clip selectively engaging said stand wherein said stand is retained in a collapsed position, said clip being coupled to a lower surface of said first plate wherein said stand is coupled to said first plate when said stand is fully retracted and said first plate is in an unextended position;

a pair of wheels coupled to said first leg; and a switch coupled to said panel, said switch being configured for coupling between a power source and the circular saw wherein the circular saw is selectively actuated by manipulation of said switch.

\* \* \* \* \*